(12) United States Patent
Costello et al.

(10) Patent No.: US 8,694,526 B2
(45) Date of Patent: Apr. 8, 2014

(54) APPARATUS AND METHOD FOR DISPLAYING SEARCH RESULTS USING TABS

(75) Inventors: Tomas Costello, Saratoga, CA (US); Louis Monier, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 698 days.

(21) Appl. No.: 12/179,467

(22) Filed: Jul. 24, 2008

(65) Prior Publication Data

US 2009/0240685 A1 Sep. 24, 2009

Related U.S. Application Data

(60) Provisional application No. 61/037,676, filed on Mar. 18, 2008.

(51) Int. Cl.
  *G06F 17/30* (2006.01)
  *G06F 15/16* (2006.01)

(52) U.S. Cl.
  USPC .......................................... 707/765; 707/768

(58) Field of Classification Search
  USPC ................................. 707/768, 765
  See application file for complete search history.

(56) References Cited

U.S. PATENT DOCUMENTS

| | | | |
|---|---|---|---|
| 5,708,825 A | 1/1998 | Sotomayor | |
| 5,768,581 A | 6/1998 | Cochran | |
| 5,867,164 A | 2/1999 | Bornstein et al. | |
| 5,983,216 A | 11/1999 | Kirsch et al. | |
| 6,098,065 A | 8/2000 | Skillen et al. | |
| 6,169,986 B1 | 1/2001 | Bowman et al. | |
| 6,424,362 B1 | 7/2002 | Bornstein et al. | |
| 6,662,177 B1 | 12/2003 | Martino et al. | |
| 6,925,608 B1 | 8/2005 | Neale et al. | |
| 6,947,930 B2 | 9/2005 | Anick et al. | |
| 7,007,074 B2 | 2/2006 | Radwin | |
| 7,031,970 B2 | 4/2006 | Blitzer | |
| 7,076,443 B1 | 7/2006 | Emens et al. | |
| 7,124,148 B2 | 10/2006 | Sauermann | |
| 7,185,001 B1 | 2/2007 | Burdick et al. | |
| 7,231,357 B1 | 6/2007 | Shanman et al. | |
| 7,376,591 B2 | 5/2008 | Owens | |
| 7,386,540 B2 | 6/2008 | Anderson et al. | |
| 7,552,113 B2 | 6/2009 | Roe et al. | |
| 7,555,476 B2 | 6/2009 | Holbrook | |
| 7,613,687 B2 | 11/2009 | Nye | |
| 7,627,552 B2 | 12/2009 | Moore et al. | |
| 7,634,462 B2 | 12/2009 | Weyand et al. | |
| 7,650,575 B2 | 1/2010 | Cummins et al. | |

(Continued)

FOREIGN PATENT DOCUMENTS

WO  PCT/US09/36549  4/2009

OTHER PUBLICATIONS

Gofman, Non-final Office Action issued to U.S. Appl. No. 12/179,464, Dec. 8, 2010, 15 pgs.

(Continued)

*Primary Examiner* — Alex Gofman
(74) *Attorney, Agent, or Firm* — Harrity & Harrity, LLP

(57) ABSTRACT

A graphical user interface includes tabs representative of different classes of search results. The tabs are derived in response to the processing of a query. The different classes of search results group content by meaning, such that a query term with different meanings produces different classes of search results with different meanings.

27 Claims, 18 Drawing Sheets

(56) References Cited

U.S. PATENT DOCUMENTS

| | | |
|---|---|---|
| 7,657,846 B2 | 2/2010 | Banks et al. |
| 7,664,739 B2 | 2/2010 | Farago et al. |
| 7,694,236 B2 | 4/2010 | Gusmorino et al. |
| 7,707,197 B2 | 4/2010 | Kaasten et al. |
| 7,712,034 B2 | 5/2010 | Gusmorino et al. |
| 7,735,018 B2 | 6/2010 | Bakhash |
| 7,739,264 B2 | 6/2010 | Jones et al. |
| 7,747,626 B2 | 6/2010 | Grimm et al. |
| 7,747,639 B2 | 6/2010 | Kasperski et al. |
| 7,769,794 B2 | 8/2010 | Moore et al. |
| 7,797,260 B2 | 9/2010 | Garofalakis et al. |
| 7,797,643 B1 | 9/2010 | Jobs et al. |
| 7,823,077 B2 | 10/2010 | Kurtz et al. |
| 7,849,080 B2 | 12/2010 | Chang et al. |
| 7,856,445 B2 | 12/2010 | Gross |
| 2003/0004831 A1 | 1/2003 | Owens |
| 2003/0204500 A1 | 10/2003 | Delpech |
| 2004/0024775 A1 | 2/2004 | Kemp |
| 2005/0027694 A1 | 2/2005 | Sauermann |
| 2005/0114317 A1 | 5/2005 | Bhide et al. |
| 2005/0222989 A1 | 10/2005 | Haveliwala et al. |
| 2005/0240576 A1* | 10/2005 | Piscitello et al. ............ 707/3 |
| 2006/0080302 A1* | 4/2006 | Schrepp et al. ............ 707/3 |
| 2006/0122968 A1 | 6/2006 | Naam |
| 2006/0155751 A1 | 7/2006 | Geshwind et al. |
| 2006/0206834 A1* | 9/2006 | Fisher et al. ............ 715/777 |
| 2006/0224624 A1 | 10/2006 | Korn et al. |
| 2006/0277167 A1 | 12/2006 | Gross et al. |
| 2007/0050339 A1 | 3/2007 | Kasperski et al. |
| 2007/0050351 A1 | 3/2007 | Kasperski et al. |
| 2007/0067267 A1 | 3/2007 | Ives |
| 2007/0067329 A1 | 3/2007 | Kamvar et al. |
| 2007/0067733 A1* | 3/2007 | Moore et al. ............ 715/777 |
| 2007/0100801 A1 | 5/2007 | Celik et al. |
| 2007/0112768 A1* | 5/2007 | Majumder ............ 707/7 |
| 2007/0124425 A1 | 5/2007 | Gross |
| 2007/0143262 A1 | 6/2007 | Kasperski |
| 2007/0174340 A1 | 7/2007 | Gross |
| 2007/0226204 A1 | 9/2007 | Feldman |
| 2007/0233692 A1 | 10/2007 | Lisa et al. |
| 2007/0244900 A1 | 10/2007 | Hopkins et al. |
| 2007/0266015 A1 | 11/2007 | Shakib et al. |
| 2007/0288864 A1 | 12/2007 | Keereepart et al. |
| 2008/0010270 A1 | 1/2008 | Gross |
| 2008/0016034 A1 | 1/2008 | Guha et al. |
| 2008/0016040 A1* | 1/2008 | Jones et al. ............ 707/3 |
| 2008/0104506 A1 | 5/2008 | Farzindar |
| 2008/0133482 A1 | 6/2008 | Anick et al. |
| 2008/0140500 A1 | 6/2008 | Kurkure |
| 2008/0140699 A1 | 6/2008 | Jones et al. |
| 2008/0168381 A1 | 7/2008 | Nelson et al. |
| 2008/0172362 A1 | 7/2008 | Shacham et al. |
| 2008/0172374 A1 | 7/2008 | Wolosin et al. |
| 2008/0184137 A1* | 7/2008 | Grimm et al. ............ 715/760 |
| 2008/0215557 A1 | 9/2008 | Ramer et al. |
| 2008/0275863 A1 | 11/2008 | Dominowska et al. |
| 2009/0006369 A1 | 1/2009 | Guday et al. |
| 2009/0198667 A1 | 8/2009 | Groeneveld et al. |
| 2009/0287559 A1 | 11/2009 | Chen et al. |

OTHER PUBLICATIONS

Hassan, Non-final Office Action issued to U.S. Appl. No. 12/179,478, Feb. 14, 2011, 14 pgs.

Alvesteffer, Non-final Office Action issued to U.S. Appl. No. 12/179,482, Nov. 29, 2010, 13 pgs.

Wiener, Non-final Office Action issued to U.S. Appl. No. 12/179,472, Apr. 14, 2011, 14 pgs.

Wiener, Non-final Office Action issued to U.S. Appl. No. 12/179,485, Apr. 14, 2011, 14 pgs.

Wiener, Non-final Office Action issued to U.S. Appl. No. 12/179,487, Apr. 14, 2011, 14 pgs.

Gofman, Final Office Action issued to U.S. Appl. No. 12/179,464, Jun. 10, 2011, 17 pgs.

* cited by examiner

FIG. 1

Cuill www.cuil.com/search thunderbird [Search]

Showing similar documents for Ford Thunderbird

2,203 Similar Documents

19 — Ford Thunderbird – Wikipedia, the free encyclopedia
The Ford Thunderbird was a car manufactured in the United States by the Ford Motor Company. It entered production for the 1955 Ford Thunderbird model year as a two-seater sporty car but, unlike the similar Chevrolet Corvette, the Thunderbird was never sold as a full-blown sports car. Ford described it as a personal luxury car, a description which named a new market segment. In 1958, the Thunderbird gained a second row of seats. Three men are generally credited with creating the original Thunderbird: Lewis D. Crusoe, a retired GM executive lured out of retirement by Henry Ford II; George Walker, chief stylist and a Ford vice-president; and Frank Hershey, a Ford designer.
http://en.wikipedia.org/wiki/Ford_Thunderbird 30 — The 1955-57 Ford Thunderbird - The Fifties Cars  90 similar docs
America in the 1950s was crazy for sport cars. Whether because of a fresh exposure to all things European during WWII, or just simply an insatiable craving for new, exciting pursuits, sports cars received tremendous public attention in the postwar era.
http://www.lot.com/fifties_cars/The_1955-57_Ford_Thunderbird.htm 32 — Lewis Crusoe - Wikipedia, the free encyclopedia  88 similar docs
He became the vice president in charge of Ford Division, then the head of the Car and Truck Divisions. He was the primary inspiration for the introduction of the original Ford Thunderbird, along with designer George W. Walker.
http://en.wikipedia.org/wiki/Lewis_Crusoe 34 — GEORGE W. WALKER  84 similar docs
Henry Ford walked out on Walker's first presentation, but the ex-professional football player rose to be Ford's design chief.
http://www.brophy.com/eodweb.htmls/designers/hd98_1.htm 36 — Frank Hershey - Wikipedia, the free encyclopedia  78 similar docs
Frank Hershey (b.1907 - d. 1997), was an American automobile designer and student of General Motors Vice President of Design Harley Earl. Hershey best known for his 1932 Peerless V-16 prototype, 1949 Cadillac tailfins and the 1955 Ford Thunderbird.
http://en.wikipedia.org/wiki/Frank_Hershey 38 — Howstuffworks 2002, 2003, 2004, 2005 Ford Thunderbird  70 similar docs
Initial reviews of the new Ford Thunderbird were largely positive. Some taller testers felt that cockpit a bit tight, and rough roads could induce unwanted body flex and cowl shake. The biggest gripe was lack of sports-car-level handling.
http://auto.howstuffworks.com/ford-thunderbird9.htm 40 — CarPrices.com - Ford Thunderbird  60 similar docs
The conventional wisdom says that the original Ford Thunderbird was a direct response to Chevrolet's introduction of the Corvette. The Corvette was shown at the 1953 Motorama, and immediately Ford designers pulled out their drafting pencils and went to work.

107 thunderbird

[Search]

http://www.cuill.com/search?m=thunderbird

Cuill

Options

Cuill

Results for Ford Thunderbird | 88,775 matches

Ford Thunderbird – Wikipedia, the free encyclopedia
The Ford Thunderbird was a car manufactured in the United States by the Ford Motor Company. It entered production for the 1955 Ford Thunderbird....    Open stack (123 docs)
http://en.wikipedia.org/wiki/For...

2002 Ford Thunderbird Road Test
The new Thunderbird is at your local Ford Dealer now and from the looks of it, they will sell every one that they build for the foreseeable future. T...
http://www.familycar.com/RoadTes...    Open stack (123 docs)

Ford Thunderbird diecast models lists – T-bird Collecting
covering T-birds released since 1954 - Not for sale. Lists by year and manufacturer plus Articles about some of the major Models made by some of those...
http://www.portholeauthority.com...    Open stack (123 docs)

Ford Thunderbird - Tag Story Index - USATODAY.com
Alan Jackson has always wanted to live somewhere similar to Gone With the Wind's Tara. The country singer got his wish with the white colonial mansion...
http://asp.usatoday.com/communit...    Open stack (123 docs)

Find 1956, 1966, 1995, 2002 Ford Thunderbird Parts And Information
One of the most popular automobiles in the world is Ford Thunderbirds. Manufactured by the Ford Motor Company, Ford Thunderbirds were designed to rese...
http://www.tbirdclub.com/    Open stack (123 docs)

Used Ford Thunderbird Cars For Sale
Finding, researching, and buying a used Ford Thunderbird online doesn't have to be a hassle. It can be easy, and dare we say, fun! Our comprehensive d...
http://www.internetautoguide.com...    Open stack (123 docs)

2004 Ford Thunderbird 2005 Ford Thunderbird 2003 Ford Thunderbird
Do you have a Ford Thunderbird Question? Click here to register free to post your 2002 2003 or 2004 2005 Thunderbird question. This is the best place ...
http://www.thunderbirdforum.com...    Open stack (123 docs)

Thunderbird Books
selecting a book takes you directly to the Amazon on-line bookstore for secure ordering. The Thunderbird Cyber Nest gets a commission from orders plac...
http://www.tbird.org/Books/books...    Open stack (123 docs)

© 2008 Cuill / About Us / Your Privacy / Terms of Use 1 2 3 4 5 6 7 8 9 10 next >

Short | Medium | Long | | 1 Column | 2 Column

Lorem ipsum dolor sit amet, consectetuer adipiscing elit. Morbi in massa condimentum magna imperdiet luctus. Fusce lobortis viverra diam. Donec nonummy Term A mi. Nulla ornare enim ac magna. In numc lorem, egestas a. egestas ut, facilist vel, turpis. Nulla at tortor ac nisi molestie elementum.

— 108

— 110

Quisque est term A, sodales in, varius sit amet, imperdiet et, arcu. Nam nibh diam, nonummy vitae, elementum nonummy, volutpat eget, nulla. In edismod. iaculis ipsum. Term A id est. Cras orci mi, vehicula vitae, congue sed vulputate eget, mi. Donec consequat. Vestibulum et pede.

FIG. 16

APPARATUS AND METHOD FOR DISPLAYING SEARCH RESULTS USING TABS

CROSS-REFERENCE TO RELATED APPLICATION

This application is related to the following concurrently filed and commonly owned patent applications:
Apparatus and Method for Displaying Search Results with a Variety of Display Paradigms, Ser. No. 12/179,464;
Apparatus and Method for Displaying Search Results Using Stacks, Ser. No. 12/179,472;
Apparatus and Method for Displaying Search Results with Configurable Columns and Textual Summary Lengths, Ser. No 12/179,478;
Apparatus and Method for Displaying Search Results with Associated Anchor Area, Ser. No 12/179,482;
Apparatus and Method for Displaying Search Results with Various Forms of Advertising, Ser. No 12/179,485;
Apparatus and Method for Displaying Search Results with a Menu of Refining Search Terms, Ser. No 12/179,487

This application claims priority to U.S. Provisional Patent Application Ser. No. 61/037,676, filed Mar. 18, 2008, entitled, "Apparatus and Method for Displaying Search Result Content and Associated Advertising", the contents of which are incorporated herein by reference.

FIELD OF THE INVENTION

The present invention relates generally to displaying search results. More particularly, the present invention relates to techniques for displaying search result content and associated advertising.

BACKGROUND OF THE INVENTION

Existing search engines typically display a list of search results associated with a search query as a list of relevant web pages. This list may include web pages with identical or similar content. For example, when a search query matches a particular section of a web page, a user is typically exposed to many copies of the same or similar information. Some existing approaches involve summarizing a single document, for example, by choosing particular sentences from the document, rather than by presenting the information as a whole from a set of documents. It would be desirable to develop a technique by which results of a search query can be grouped efficiently so that the duplicate content appearing to the user is minimized.

Further, existing approaches to refine a search associated with a search query typically involve entering a new search query. Some search engines include suggested topics in response to a search query. However, these suggestions are generally based on criteria, such as popularity or past search criteria. It would be desirable to develop a technique by which query refinements for a search query can be automatically generated from a search result set.

The current state of the art in Web advertising relies upon relatively simple advertisement placement paradigms. Current approaches to web advertising typically involve displaying sponsored link advertisements or banner advertisements for a given search term. Sponsored link advertisements are generally listed in an order determined by the search engine, typically by some combination of pay-per-click bid auction and relevancy factor. Currently, search engines enable advertisers to pay, usually by bidding for sponsored link placements along with non-sponsored search results or for keywords to which the advertisers want to match sponsored link advertisements. Refining an advertisement typically involves entering a new bid on the keyword query extension. Exisiting approaches may provide suggestions to advertisers on which additional keywords and query extensions to bid. Even with these suggestions, advertisers typically guess the keywords that users may use to refine their searches and then bid on those keywords. Furthermore, these suggestions are typically based on popularity, past searches or other criteria, so that bidders who bid on these keywords have a possibility of their advertisement being displayed.

It would be desirable to develop a technique by which advertisements can be automatically generated from the search results associated with a search query. In addition, it would be desirable to develop a technique by which the placement of advertisements is not directly related to the bidding on specific keywords or query extensions to those keywords, but can be determined based upon criteria entered by an advertiser.

SUMMARY OF THE INVENTION

A graphical user interface includes tabs representative of different classes of search results. The tabs are derived in response to the processing of a query. The different classes of search results group content by meaning, such that a query term with different meanings produces different classes of search results with different meanings.

BRIEF DESCRIPTION OF THE FIGURES

The invention is more fully appreciated in connection with the following detailed description taken in conjunction with the accompanying drawings, in which:

FIG. 1 illustrates tabs representative of different classes of search results that are derived in response to the processing of a query.

FIG. 2 illustrates a differential presentation of stacks associated with a search query, in accordance with one embodiment of the present invention.

FIG. 4 illustrates tabs, stacks and drill down categories displayed for an exemplary search query.

FIG. 6 illustrates stacks and drill down categories displayed for a sponsored tab, in accordance with one embodiment of the present invention.

FIG. 7 illustrates exemplary sponsored and non-sponsored drill down categories associated with a search query, in accordance with one embodiment of the present invention.

FIG. 9 illustrates the display of a traditional banner advertisement responsive to a search query, in accordance with one embodiment of the present invention.

FIG. 11 illustrates a sponsored snippet displayed next to a non-sponsored search result.

FIG. 12 illustrates a graphical user interface screen display with long length snippets.

FIG. 13 illustrates a graphical user interface screen display with short length snippets.

FIG. 14 illustrates a search results page with displayed snippets.

FIG. 15 illustrates a graphical user interface screen display, displaying long length snippets in a single column presentation format.

FIG. 16 illustrates a user interface screen display, displaying long length snippets in a double column presentation format.

Like reference numerals refer to corresponding parts throughout the several views of the drawings.

DETAILED DESCRIPTION OF THE INVENTION

Figure 3:
FIG. 3 illustrates drill down results displayed for an exemplary search query.

Embodiments of the present invention disclose a graphical user interface for a search engine. The disclosed embodiments include techniques for interacting with data, in particular with search results responsive to a query. As will be described in greater detail below, the disclosed graphical user interface is designed based on a set of commands and organizes data (e.g., documents, web pages) based on concepts (meanings) associated with the data. The organized data is dynamically derived using the commands in response to the processing of the query. Embodiments of the present invention may be implemented on a computer screen user interface, a desktop, a mobile device user interface or any other networked environment user interface.

Figure 1:
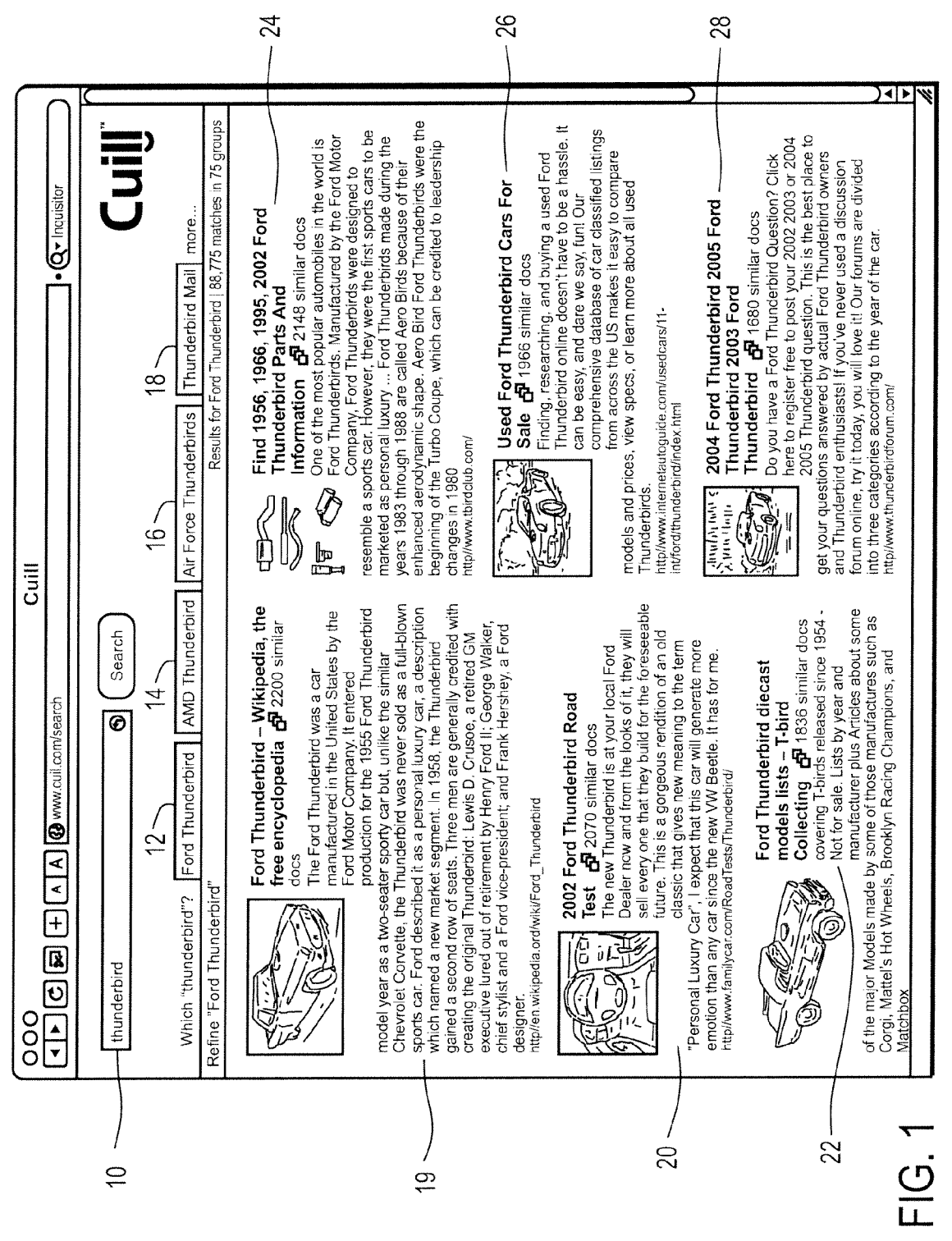

In one aspect of the present invention, a tab-based technique for displaying search results in a graphical user interface is disclosed. In one embodiment, a Search Result Tab Display Module 212 (shown in FIG. 18) includes executable instructions to display tabs representative of different classes of search results derived in response to the processing of a query. FIG. 1 illustrates one or more tabs representative of different classes of search results that are derived in response to the processing of a query. As will be discussed in greater detail below, the different classes of search results are grouped by meaning, such that a query term with different meanings produces different classes of search results with different meanings. In the particular example illustrated in FIG. 1, tabs 12, 14, 16 and 18 representative of different classes of search results associated with a query term, "thunderbird" 10 are displayed. Observe that each tab has associated text characterizating the different classes of search results. In one embodiment, the tabs associated with a particular query term may be derived dynamically by selectively invoking pre-existing categories. For example, and as will be discussed in greater detail below, the tabs may be derived dynamically utilizing Markov techniques to group unstructured text sources or by extracting semi-structured data groups, based upon shared lexical features or based upon ontological features.

Each tab includes a related query (or query extensions) representative of different concepts (meanings) associated with the query term. For example, the query term, "thunderbid" 10, includes a "Ford Thunderbird" tab 12, which is a query extension to refer to a type of a car, an "AMD Thunderbird" tab 14, which is a query extension to refer to an aerobatics group, an "Air Force Thunderbirds" tab 16, which is a query extension to refer to an airforce group and a "Thunderbird Mail" tab 18, which is a query extension to refer to a freeware email program.

Observe that the related queries included in the tabs replace the original query term with a more focused set of documents, thereby refining the search query. A user can then select a tab displaying a query extension to run a more precise search query, as will be described in greater detail below. The related queries for a query term may be generated based upon a number of criteria including, but not limited to, stems (for example, singular/plural), abbreviations (for example, CA or Cal for California), word grouping (for example, spider man, spiderman, spider-man), spelling variations, semantic relationships such as generalizations or specializations, for example, hyponyms or hypernyms (red shoes, scarlet shoes, vermillion shoes), synonyms, acronym expansion, terms that divide a search space into substantially non-overlapping subsets, capitalization and Markov techniques that consider preceding and subsequent terms for a related query Each related query displayed in a tab further includes at least one search result including a list of web documents, as will be described in greater detail below. In one embodiment, one or more sub-tabs within each class of search results may further be displayed. In one embodiment, the tabs may also include images characterizing the different classes of search results, wherein the images characterize the related queries.

In addition to being a mixture of all concepts (meanings), each concept (meaning) represented by a tab may also be kept separate from the other tabs, and displayed with a set of documents relevant to the particular concept or meaning associated with the tab. Other concepts (meanings) and their associated results may be selected by choosing the appropriate tab.

Further, the tabs may be displayed anywhere in the graphical user interface page. In one embodiment, a "default tab" may also be included, which captures the sum of all the meanings and displays an initial/default set of results associated with the search query term. If there are numerous query extensions associated with a search query term, the query extensions may also be displayed using a drop-down menu that supplements the tabs. The number of tabs displayed and which query extensions are displayed as tabs, as well as the order, may be selected based upon criteria, such as the space available for display, the relevance of the query extensions and other criteria chosen by the search engine. In one embodiment, the criteria may include the quality of the returned pages by using a query independent metric of quality of the pages, or a query dependent metric of quality of the pages. In another embodiment, the criteria may also include the meaningfulness of the query extension determined by how often and where it appears on the web, by how much it co-occurs with other possible query extensions on the web, by whether it is a well formed noun phrase as judged by rules, by statistical methods, by whether it occurs with particular capitalizations or by Markov methods that consider the preceding and following terms for that query extension. The query extensions may also be determined by manual editing, either by initial machine generated possibilities followed by a human step of removing erroneous entries, or by human generated possibilities.

The determination of the tabs to display initially may be performed based on criteria, such as, for example, pre-existing human specified criteria, a historical tab click through data determined by historical measures of what tabs are clicked on, order of tab selection, measures of the quality (both query dependent and query independent) of the results of each tab candidate, lexical metrics (capitalization and length), uniqueness metrics as measured by co-occurrence, cosine difference, overlap metrics, preferences among parts of speech or ontological classes (proper names, places, noun phrases beginning with colors), measures of network occurrence change, measures of click through change as measured by changes of behavior in what pages are clicked on and measures of queries issued and measures of page dwell times.

Query extensions can also be grouped according to common criteria determined with respect to the search results returned. For example, query extensions referring to people, geography, or other common factors by which search results relate can be placed under one tab, based upon criteria determined by membership in a larger list, extracted automatically from unstructured text sources by Markov methods, generated from smaller lists by clustering, extracted by regular expressions from semi-structured data, extracted from larger lists by selection of certain elements having shared lexical or ontological features or derived by some other suitable method. Further, the tabs may be listed by alphabetic order, or arranged by the quality of documents based upon a ranking score.

In accordance with another aspect of present invention, "stacks" organizing different classes of search results are derived in response to the processing of a query. In one embodiment, a list of web documents may be dynamically grouped into a stack in response to a search query. The dynamic grouping may be performed, for example, by forming stacks of documents with similar conceptual propositions, forming stacks of documents with common information, forming stacks of documents in accordance with distance metrics which may use clause, sentence and paragraph boundaries as well as HTML markup to quantify distance. Stacks of documents may also be formed in accordance with semantic and statistical criteria which determine the relationship between terms that may be used to quantify which parts of the page are relevant and their degree of relevance by inducing a metric on areas identified by a metric on the contents. Stacks of documents may be formed in accordance with clustering criteria, induced metrics, lexical criteria, ontological criteria or mention frequency based on identifying the additional notions referenced on a subset of the pages in the stack that are related to the search query under consideration. In one embodiment, a Search Result Stack Display Module 214 (shown in FIG. 18) includes executable instructions to display stacks that have common attributes associated with a tab, but where each stack has a refined meaning representing a different class of search results.

Returning to the example illustrated in FIG. 1, stacks 19, 20, 22, 24, 26 and 28 associated with the "Ford Thunderbird" tab 12 are displayed. Observe that each stack includes text and an associated image characterizing the different classes of search results. In one embodiment, the images may be represented by icons. The images characterize the content of the stack and may be dynamically selected in response to the processing of the query. The text summarizes what is unique regarding each stack created in response to the query.

In one embodiment, the text descriptions may be generated automatically as a summary of the stack's contents. The content of the summary is similar to the content of all the web pages in the stack that are relevant to the query. In one embodiment, the description may be a paragraph cited from a web page in the stack. In another embodiment, the text description may be a summary of what is unique about the stack, generated automatically from all of the web pages in the stack based upon a set of pre-defined criteria. Images may also be automatically chosen. In one embodiment, the images may be chosen from the web pages in a stack based upon criteria such as identifying images that occur multiple times in the stack. Images that are labeled (or co-occur) with certain terms in the stack may also be selected, especially if those terms occur with high information gain in the stack or are in certain HTML constructs, for example, title or images that are similar to other images in the stack as judged by a label (either included in the stack or as a generated label from another page where the image if found), direct comparison, color palette, or filename. Images and text descriptions may also be generated separately, combining the results on the user interface page after the images and text have been separately processed.

The stacks may further include characterization information. In one embodiment, the characterization information is dynamically derived. In one embodiment, the characterization information may include text characterizing stack content. In another embodiment, the characterization information may include images characterizing stack content. The characterization information may further include icons characterizing stack content, text selected from a document in a stack or text that is automatically generated to characterize content within a stack. The characterization information may be derived from sources referencing documents in a stack. The characterization information may be selected from a library of images, from redundant images in a stack, from a label associated with an image or from an HTML label associated with an image. In one embodiment, the characterization information may be an icon selected from a library of icons. The characterization information may be accumulated in parallel processes and then combined to form a stack. The characterization information may be accumulated in a single process to form a stack. The characterization information may include text characterizing similar classes of search results represented in stacks. The characterization information may further include a number specifying the number of related documents in a stack.

In one embodiment, the documents in a stack may be displayed with a flip through menu. In another embodiment, the documents in a stack may be displayed with a drop down list menu. The documents in a stack may also be displayed with a scroll over pop-up screen.

Each stack may further be organized into one or more sub-stacks. A second order sub-stack within a sub-stack may also be included. For example, clicking on one stack may result in the display of a set of sub-stacks. Similarly, clicking on a sub-stack may result in the display of another set of sub-stacks. This may be repeated as long as search results are available.

In one embodiment, a "differential representation" of the stacks is generated as a result of the comparison of information in web pages and the associated images of web pages grouped in a stack or a sub-stack. The "differential representation" identifies to the user identical or similar information in a stack or a sub-stack of web pages returned in response to a search query. Although stacks and sub-stacks have a defined structure, the web pages in a stack or sub-stack are not strictly identical, despite their shared relevance to the query. Accordingly, the information in a stack may include second-order differences. In accordance with one embodiment of the present invention, the "differential presentation" of the stacks groups the web pages inside the stacks and sub-stacks by second-order similarity and highlights the similarities or differences between the web pages within a stack or sub-stack so that these stacks or sub-stacks offer an efficient navigation through those web pages to users. This process of grouping by lower-order similarity can be repeated again for these stacks or sub-stacks, as long as there are enough web pages available in them. In one embodiment, the related information in a stack may be designated with contrast criteria. The contrast criteria is selected from highlighting, strike through, underlining, bolding, italics, and font color. The related information in a stack is designated with second order similarity criteria.

FIG. 2 illustrates a differential presentation of stacks associated with a search query in accordance with one embodiment of the present invention. As illustrated, the differences between the information included in a set of stacked results is displayed to a user by displaying the identical or similar information in the web pages of the stack, and also displaying the differences between the web pages in the stack. In the illustrated example, differential presentations 30, 32, 34, 36, 38 and 40 associated with the stack "Ford Thunderbird—Wikipedia, the free encyclopedia" 18, for the search query term, "thunderbird" 10 are displayed. The differential representation, "The 1955-57 Ford Thunderbird—The Fifties Cars" 30 groups together the cars of that era. Observe that the differential presentation includes a description of the stack and identifies the type of information that is grouped together in the stack. Similarly, the stack "George W. Walker" 34 provides information about the designer of the car.

Those skilled in the art will recognize that the use of "stacks" representing different concepts or meanings, in accordance with embodiments of the present invention, maximizes the diversity of content on a search result page and decreases the replicated information that appears in the user interface screen display. The grouping of the results occurs dynamically, during query execution, enabling the efficient processing of search results. Further, the automatically generated images disclosed in accordance with embodiments of the present invention provide a visual summary of a group of information included in web pages grouped in a stack, In another aspect of the present invention, a drill down technique for analyzing the results of a query is disclosed. In one embodiment, a Search Result Drill Down Module 216 (shown in FIG. 18) includes executable instructions to display a listing of results derived from processing a query. The Search Result Drill Down Module 216 further includes executable instructions to display a menu of refining search terms that is dynamically derived in response to the processing of the query. In a particular embodiment, the analysis includes infering a set of terms that are good refinements for the query and providing them as guidance to the user for refinement of the current search or for a future search query. These terms may be grouped into meaningful labeled lists. Selecting one of the terms from one of these lists executes the more precise query, as will be discussed in greater detail below.

FIG. 3 illustrates drill down results displayed for an exemplary search query. In one embodiment, the drill down results include a menu of refining search terms that are dynamically derived in response to the processing of a query. In one embodiment, the menu is a multi-level pull-down menu. In the illustrated example, a drill down menu 40 is displayed that lists search term refinements for the search query, "thunderbird" 10. The determination of the categories (i.e., the search term refinements) to be displayed in the drill down menu may be determined based on criteria including, but not limited to, stems, abbreviations, word grouping, spelling variations, semantic relationships, synonyms, acronym expansion, terms that divide a search space into substantially non-overlapping subsets, capitalization, and Markov techniques that consider preceding and subsequent terms for a related query.

The search term refinements may be based upon predetermined ontologies. In one embodiment, the search term refinements may be based upon extracted ontologies. In another embodiment, the search term refinements may be based upon induced relationships from the co-occurrence of sets of objects. The search term refinements may also be based upon markup group search results, regular expression group search results, Markov model group search results, grammatical pattern group search results, context free pattern group search results, predetermined rule group search results or machine learned rule group search results. The search term refinements may also be based upon combinations of group search results, combining Markov model group search results, ontological restriction group search results, lexical restriction group search results or co-occurrence restrictions. The order of search term refinements may be based upon page rankings, the number of web pages selected, the overlap of web pages, the percentage of documents selected, a quality metric, or the relevance between list items and specified concepts.

Figure 4:
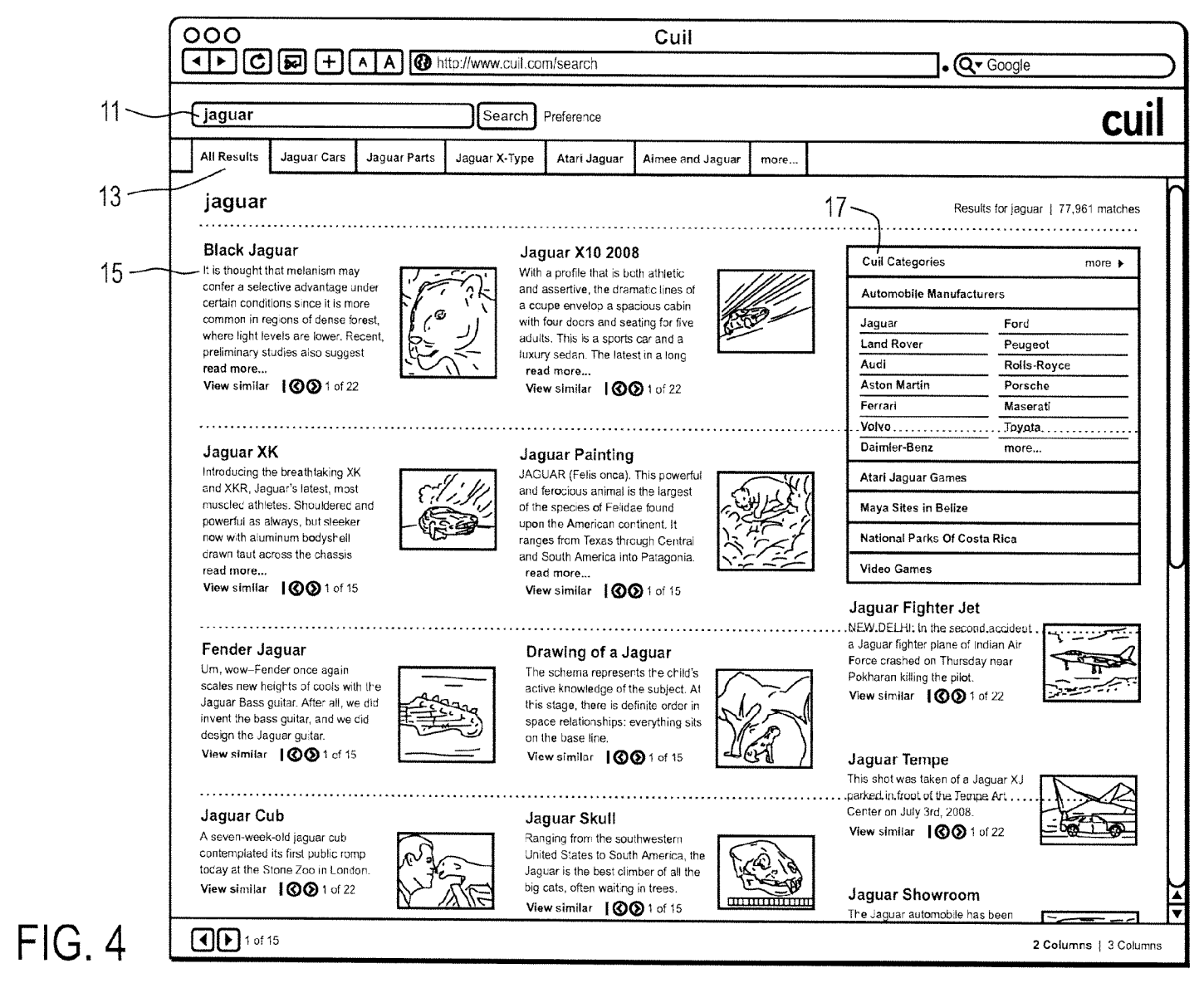

FIG. 4 illustrates tabs, stacks and drill down categories displayed for an exemplary search query. In the illustrated example, search results for an exemplary search query term, "jaguar" 11 are displayed. In an exemplary operation, upon execution of the search term, "jaguar" 11, a user is presented with one or more tabs representative of the different classes of search results associated with the search query. Upon selection of a particular tab, for example, "All Results" 13, the user is presented with one or more "stacks" that organize the different classes of search results corresponding to the selected tab. As discussed above, the "stacks" may include web documents with similar contexual propositions associated with the search query term "jaguar" 11. As further illustrated, the user is also presented with a "drill down list" 17 of category information corresponding to the selected tab, "All Results" 13 derived in response to the processing of the query term, "jaguar" 11.

In another aspect of the present invention, a technique for displaying advertisements and sponsored advertising content is disclosed. In one embodiment, a Search Result Advertisement Display Module 218 (shown in FIG. 18) includes executable instructions to display a set of advertisements associated with a search query term. In one embodiment, an advertisement is selected based upon a document retreived by processing a query. An advertisement may include, for example, an image, text or an icon. Further, an advertisement may be visually differentiated from content in the document. In one embodiment, the advertisement may be placed adjacent to a specified concept associated with the document. The advertisement may be retrieved from an advertiser's web page. In one embodiment, an advertisement with a link to a search results page is provided to the user.

In a particular embodiment, advertiser criteria may be specified in a "tab" as a query extension that provides links to sponsored advertisement pages. In one embodiment, such tabs are referred to as "sponsored tabs". The tabs may be sponsored by an advertiser. In one embodiment, a sponsored tab is visually differentiated from a non-sponsored tab. The sponsored tabs may include for example, a display advertisement, advertisements in a visual image analogous to what would be seen in a publication like a newspaper or magazine, video and other forms of advertisements that may include images, titles, descriptions, or other media content, as well as text descriptions to describe the advertisement. In one embodiment, the sponsored tab is readily apparent to a user through one or more methods, including applying differential coloring to identify the sponsored tab, identifying the sponsored tab with a logo or brand or other methods.

Figure 5:
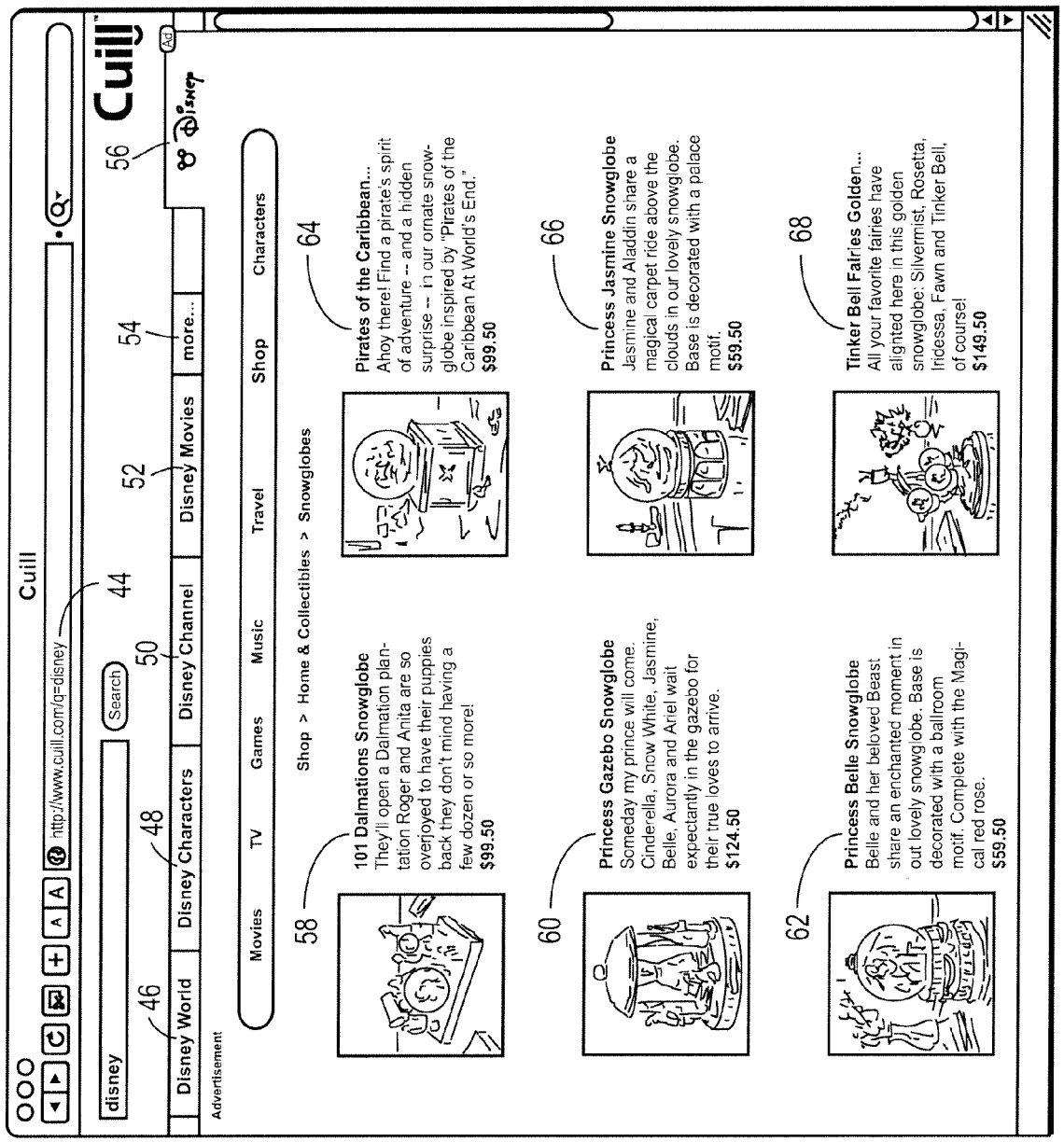
FIG. 5 illustrates exemplary non-sponsored and sponsored tabs displayed for a search query, in accordance with one embodiment of the present invention.

FIG. 5 illustrates exemplary non-sponsored and sponsored tabs displayed for a search query, in accordance with one embodiment of the present invention. A search results page that includes sponsored and non-sponsored content is illustrated. In the illustrated example, a search query "disney" 44 includes one or more non-sponsored tabs 46, 48, 50, 52 and 54 that link to general content associated with the search query "disney" 44 and a sponsored tab 56. Selecting the sponsored tab 56 creates a link to an advertiser's web page associated with the search engine. A refining search tern and an associated sponsored advertisement link may also be provided. In this example, the advertiser, "Disney" may purchase the right to display the sponsored tab 56 for queries that match certain criteria (for example, any query with the word "disney"). The different advertisements for Disney products, which may include one or more stacks 58, 60, 62, 64, 66 and 68 for grouping similar advertisement pages are also displayed in FIG. 5.

In one embodiment, a user clicking on a sponsored tab is directed to a web site without returning a search result page. In other words, a user is not taken off-site from the search engine's page to the advertiser's web page. Instead, the user views the content in the sponsored tab itself and navigates the results in the sponsored tab using the search engine's graphical user interface. In order for the content in the sponsored tab to be current, the search engine updates the information in its sponsored tabs either directly by working with the advertiser to provide the most up to date information or by crawling the advertiser's website.

The form of payment by the advertiser to the search engine for sponsored tabs may take one of many forms, such as pay-per-placement, where the advertiser pays each time a sponsored tab (or the image and text description in the sponsored tab itself) is displayed, or pay-per-click when the advertiser pays each time the sponsored tab (or the image and text description in the sponsored tab itself) is clicked by the user, or pay-per-action, when the advertiser pays the search engine when the specific action (such as an order or purchase action) is taken or any combination of the above, as well as any other form of payment that the advertiser and the search engine agree upon. The disclosed technique does not limit the form or the value or the way in which payment agreements are made between the advertiser and the search engine. In one embodiment, a common payment agreement such as an auction or fixed price agreement based on click-through or impressions (displays) of an advertisement may also be utilized.

Figure 6:
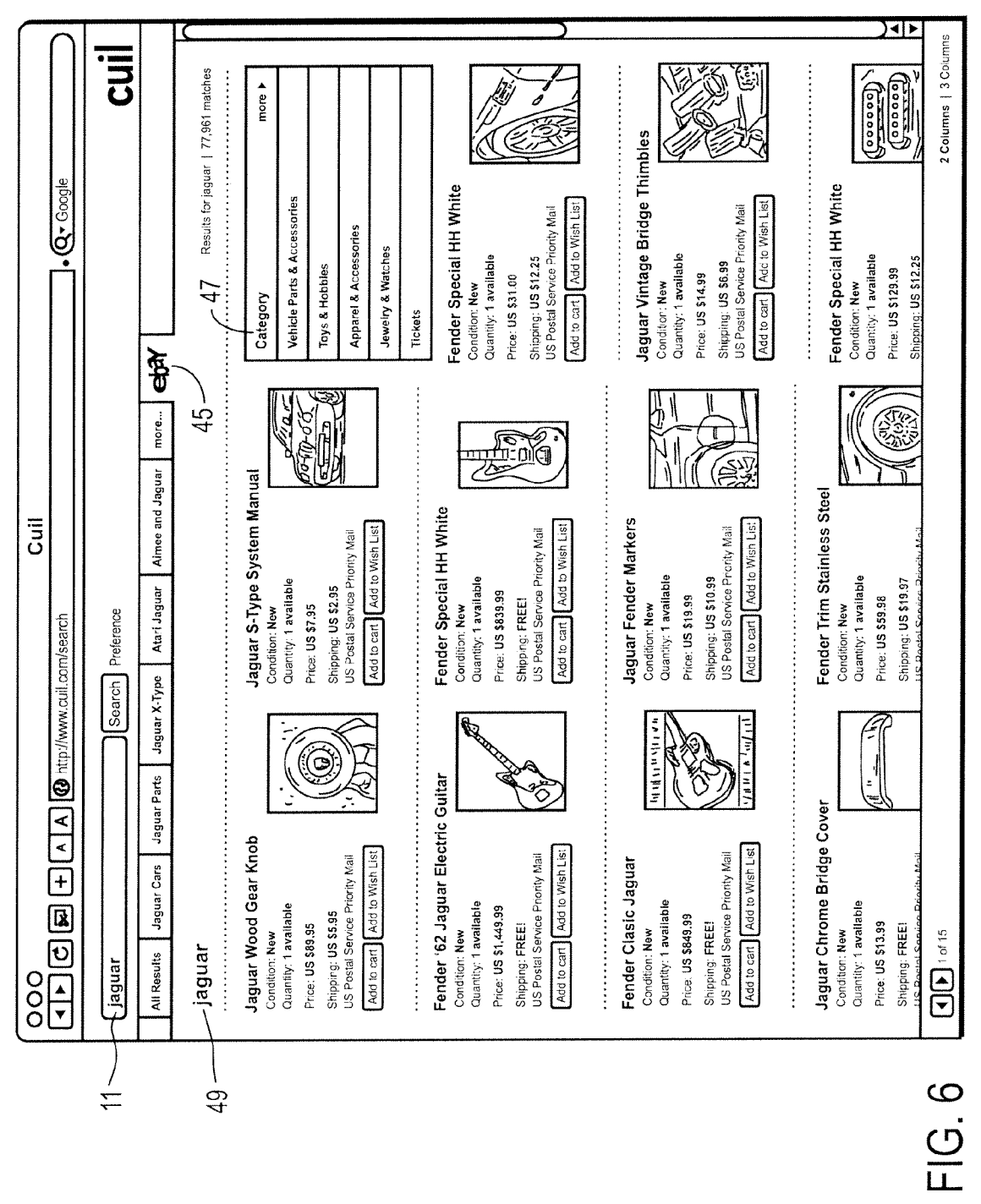

FIG. 6 illustrates stacks and drill down categories displayed for a sponsored tab, in accordance with one embodiment of the present invention. In the illustrated example, upon selection of the sponsored tab, "eBay" 45, the user is presented with stacks that include different advertisements associated with the search term, "jaguar" 11 and drill down category information 47 retrieved from the advertiser's web site, in this case, "eBay" 45. Observe that a user can navigate the results associated with the sponsored tab without being taken off-site from the search engine's web page to the advertiser's web page.

In another embodiment, a drill down menu with advertisement content is provided. As will be discussed in greater detail below, a drill down menu with a link to a sponsored tab may also be provided. In other embodiments, a drill down menu with a link to a search results page with an advertising link and organic results, a drill down menu with a link to an advertiser web page, a drill down menu with a link to non-sponsored domains and sponsored domains and a drill down menu with a link to a sponsored action may be provided.

Figure 7:
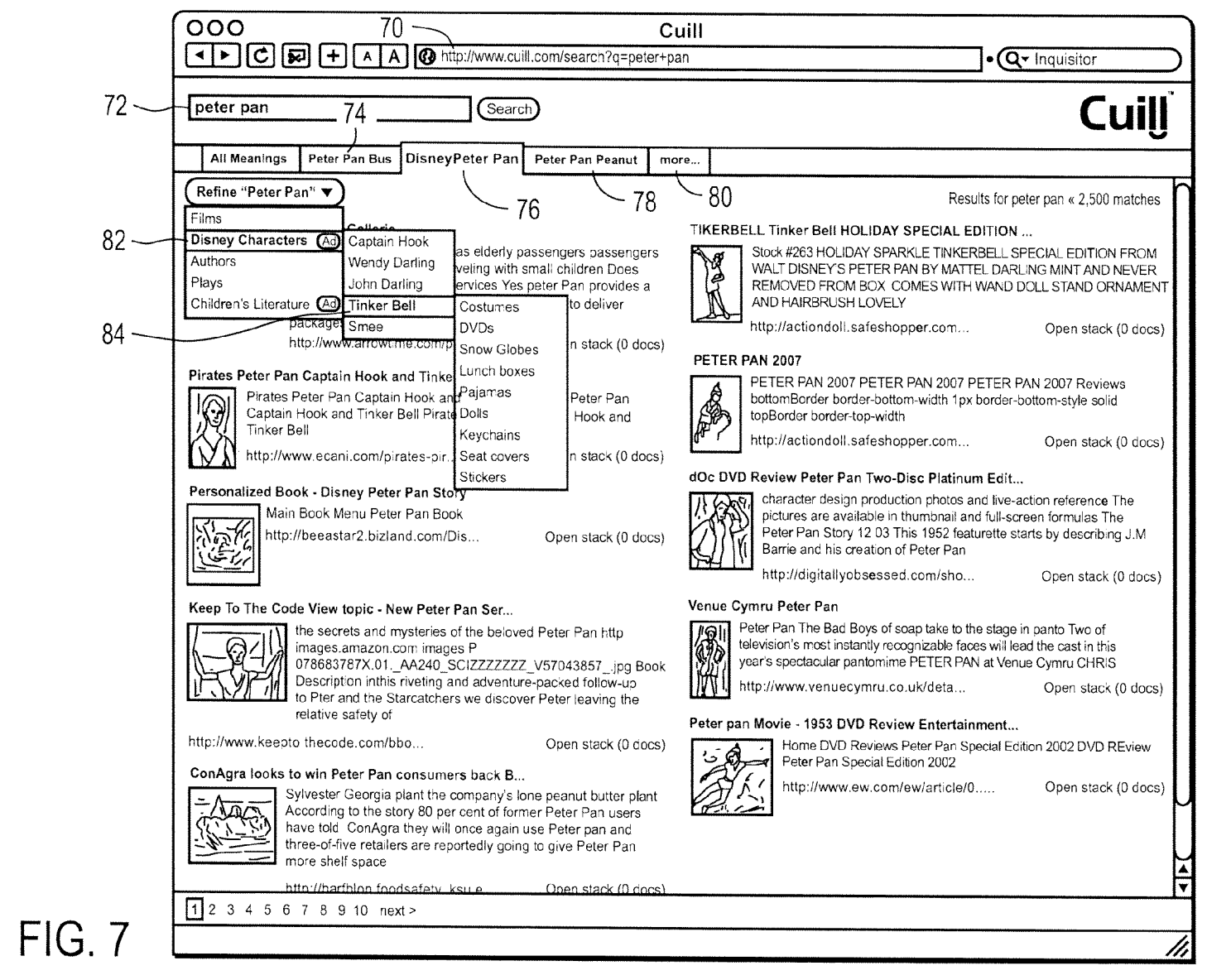

FIG. 7 illustrates exemplary sponsored and non-sponsored drill down categories associated with a search query, in accordance with one embodiment of the present invention. Non-sponsored search query extensions "All Meanings" 72, "Peter Pan Bus" 74, "Disney Peter Pan" 76, "Peter Pan Peanut" 78 and "more" 80, associated with a search query term, "peter pan" 70 are displayed. A drilldown refinement menu 82 displays non-sponsored and sponsored drill down categories. In the illustrated example, the drilldown categories "Films", "Authors" and "Plays" are non-sponsored drill down categories, while "Disney Characters" and "Children's Literature" are sponsored drill down categories. The sponsored drill down categories "Disney Characters" and "Children's Literature" lead to further drill down categories with sponsored content such as "Costumes", "DVDs", "Snowglobes" and so on for the Disney character "Tinker Bell".

The disclosed drill down technique is also applicable to sponsored advertisement categories. In one embodiment, the drill down categories that may be sponsored include refinements that take the user to a sponsored tab. The drill down categories may also take the user to a search results page of the search engine that includes an advertising link intermixed among organic results, as will be discussed in greater detail below. In other embodiments, the sponsored drill down categories may take the user to a web page established by the advertiser to further drilldown categories that may include any combination of non-sponsored and sponsored drilldown choices, to a sponsored action (described below), to specific features, models, colors, services, prices or other attributes of a product, service or advertisement or to any other form of advertising content, either solely displayed or mixed with non-sponsored results, within or outside the search engine's web pages. In addition, the placement of the sponsored drill down categories may be anywhere within the drill down menu.

In one embodiment, the sponsored drill down categories may be prominently displayed such as, for example, by including a note next to the category, such as "ad" 84 displayed next to the sponsored category, as illustrated in FIG. 7. The sponsored data drill down categories may include any combination of additional information including the identity of the advertiser, price, functions, models, brands and other relevant aspects that may be displayed in the primary or one or more ancillary drill down menus.

In another embodiment of the present invention, a technique for the placement of advertisements on a search results webpage is disclosed. In accordance with one embodiment of the invention, an advertisement may be placed anywhere on the search results webpage, including intermixed with non-sponsored results or placed outside the non-sponsored results. The advertisements may include banner advertisements or sponsored links and may contain images, text descriptions, video and or other forms of advertising. In one embodiment, a non-sponsored result is differentiated from a sponsored result by displaying a note next to the sponsored result.

Figure 8:
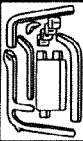
FIG. 8 illustrates a stack of advertisements displayed in response to a search query, in accordance with one embodiment of the present invention.

FIG. 8 illustrates a stack of advertisements displayed in response to a search query, in accordance with one embodiment of the present invention. The illustrated embodiment displays a sponsored link "Napa Auto Parts" 86 and the note "Ad" 88 identifies that the search result is an advertisement.

Figure 9:
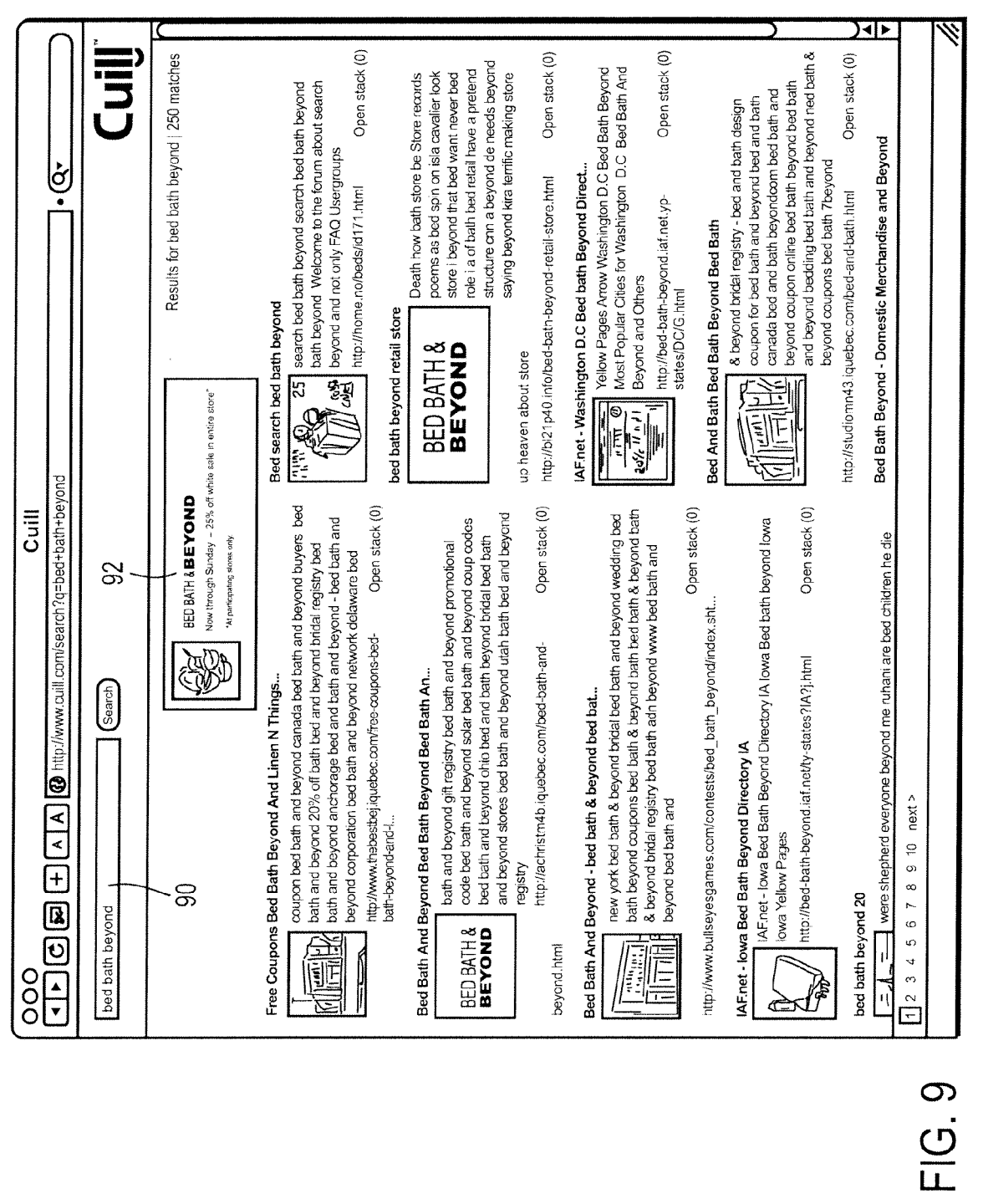

FIG. 9 illustrates the display of a traditional banner advertisement responsive to a search query, in accordance with one embodiment of the present invention. In the illustrated example, the banner advertisement "Bed Bath Beyond Now Through Sunday Sale" 92 is responsive to the search query, "bed bath and beyond" 90.

In another embodiment, the advertisement may include a link to a sponsored action. A menu for a sponsored action may also provided. A user may wish to engage in "sponsored actions" to purchase a product from the advertiser through links displayed within a description associated with a sponsored tab or within the search query result page. In one embodiment, a sponsored action link may be displayed next to an advertisement or a non-sponsored search result for a product displayed on a search result page.

Figure 10:
FIG. 10 illustrates advertisements generated for a search query, in accordance with one embodiment of the present invention.

FIG. 10 illustrates advertisements generated for a search query, in accordance with one embodiment of the present invention. In the illustrated example, advertisements for a search query "flatscreen TV" 94 are displayed. The sponsored action link "Buy It" 96 is shown next to the non-sponsored search result, "Thompson Thompson Multi-" 98. As a user scrolls over the action link 96, a temporary pop-up menu 100 appears with one or more advertisers for the action. The order of preference may be auctioned or combined with some factor to identify the highest listed advertiser.

Figure 11:
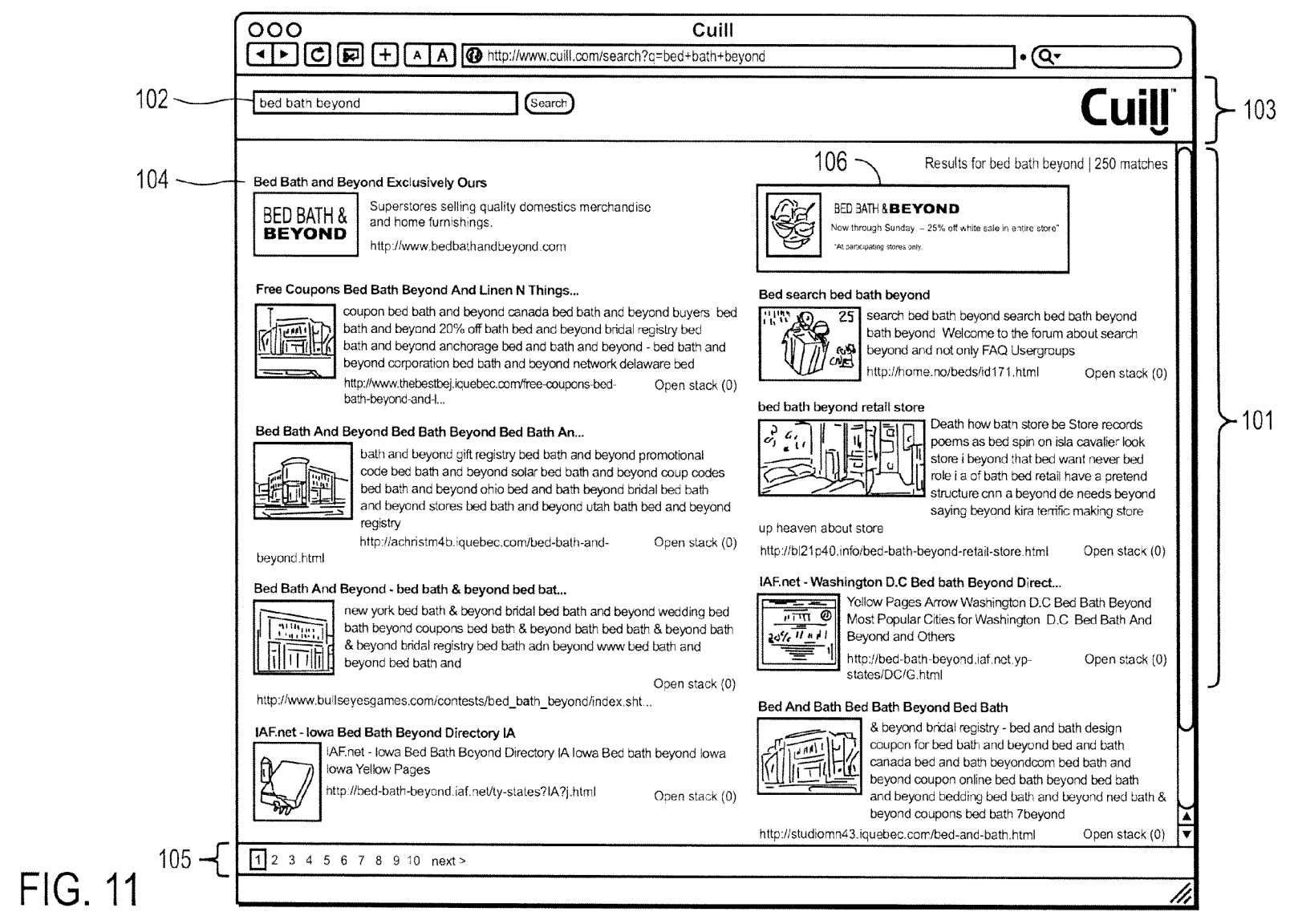

FIG. 11 illustrates a sponsored snippet displayed next to a non-sponsored search result. The sponsored snippet provides additional information not availabe in the non-sponsored result. In the illustrated example, a non-sponsored search result "Bed Bath and Beyond Exclusively Ours" 104 is displayed as a result of the query for "bed bath beyond" 102. An advertisement or sponsored snippet 106 indicating a current sale is displayed on the same search page. The placement of the advertisement or sponsored snippet near the specific URL is advantageous because it is based on the content of the search results the search engine displays, rather than in response to a keyword search query. Another advantage of placing a sponsored snippet or advertisement near a non-sponsored URL link is that it conveys information beyond what can be found on a non-sponsored URL link or snippet. In the example specified, the Bed Bath and Beyond home page snippet 104 does not change as often as the store has sales so the advertisement or sponsored snippet 106 provides additional information about a limited time only sale. The information to be provided in the sponsored snippet or advertisement can be provided by the advertiser directly or it could be a crawled advertisement indexed by the search engine.

In addition, in accordance with one embodiment of the present invention, an anchored area can be placed anywhere on the search results user interface page and can include advertisements, features, announcements, an area to store search results that the user wants to keep for later review, a search box or other relevant content. As illustrated in FIG. 11, an anchored footer area 105 includes pagination controls for going from page to page and an achored header area 103 includes the search bar. Observe that the header and footer areas are not scrolled over by a user. An anchored content area 101 may be placed anywhere on the search results user interface page. Accordingly, a user can scroll up and down the search results but maintain an anchored area on the page. Further, the anchored search bar 103 may be placed anywhere on the search results page such as on the top, on the side, or the bottom or elsewhere on the search results page such that a user who scrolls through the results maintains a visible search box while scrolling through the search results. Embodiments of the present invention differ from current state of the art Internet search engines, which generally provide a search box, typically at the top and/or bottom of a search engine results page, which is not anchored and thereby disappears when a user scrolls down the list of search results that take up more than the displayed browser window.

In another embodiment of the present invention, advertisers may enter multiple criteria (for example, color, function, price, models, brands, discounts) to enable the navigation of users to advertisement pages. The criteria may be entered through a graphical user interface included in the search engine. Advertisers may enter the criteria freeform or into designated categories specified by the search engine. The search engine may use these criteria directly (i.e., place all or a portion of the specific criteria in the drilldown listed information) or the search engine may infer information from that criteria to drive the search choices towards content provided by the advertiser. The information inferred may help target the message of the advertiser who entered the criteria to specific search queries, specific drill down query extensions, tabs or other information displayed by the search engine.

Figure 12:
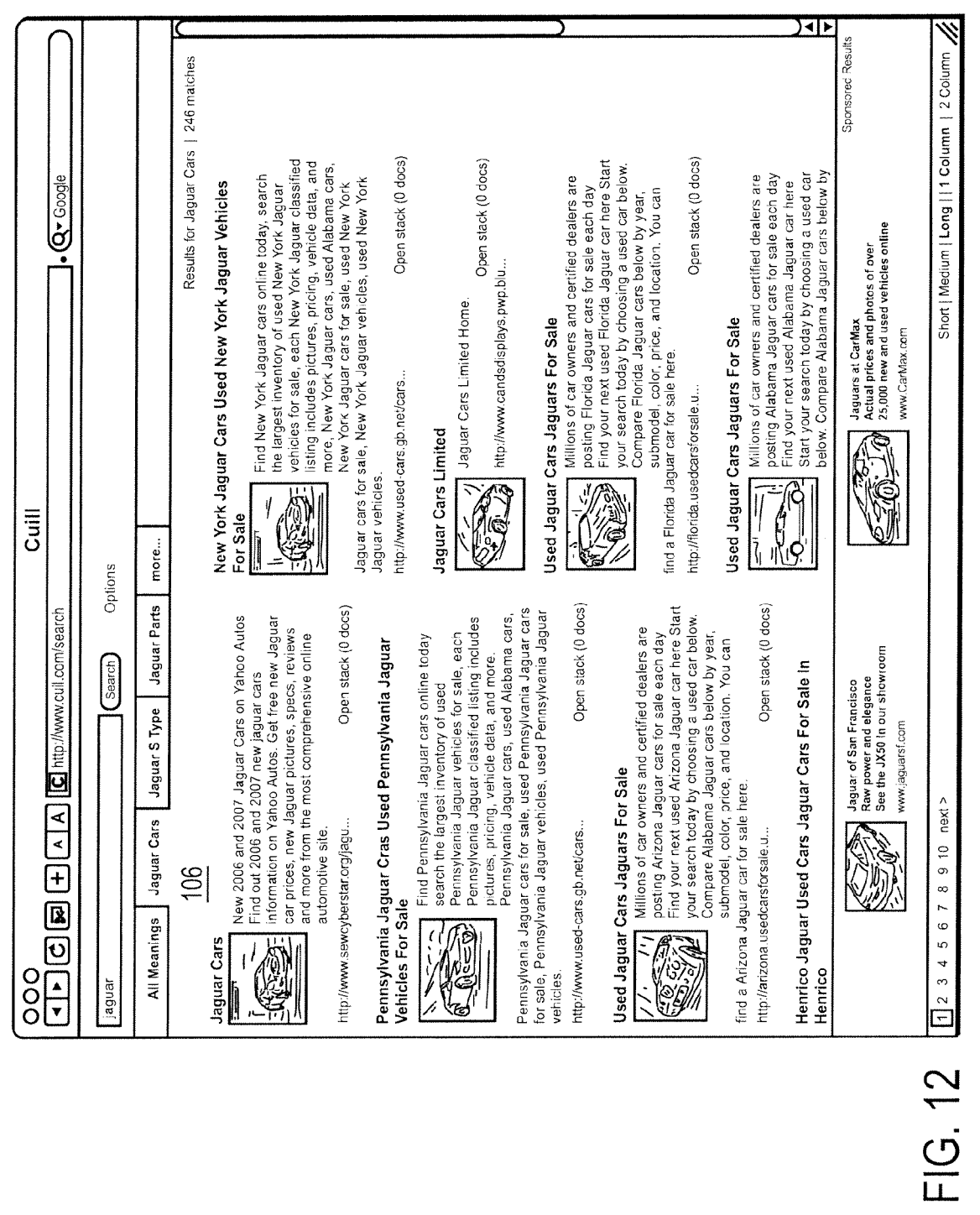

In another aspect of the present invention, text snippet results displayed in a search result user interface page may be changed to differing lengths depending on factors such as a user's preference, a preferred look depending on the type of web browser utilized, the size of the browser window or other display preferences determined by the user or the search engine. In one embodiment, a Text Snippet Display Module 220 (shown in FIG. 18) includes executable instructions to display text snippet results associated with a search query term. FIG. 12 illustrates a graphical user interface screen display with long length snippets. An exemplary long length snippet is illustrated by the reference numeral 106. FIG. 13 illustrates a graphical user interface screen display with short length snippets. An exemplary long length snippet is illustrated by the reference numeral 107. As will be appreciated by those skilled in the art, the utilization of short snippets for displays is advantageous in cases where the screen space is limited, such as, for example, in mobile devices.

In one embodiment, configurable parameters to format the search results may further be provided. The configurable parameters may specify a column configuration and a textual summary length. The column configuration may be configured in response to the quantity of search results. The textual summary length may be configured in response to the quantity of search results. Further, the column configuration and the textual summary length may be configured based upon the type of browser or the browser window size. In certain embodiments, the textual summary length may be specified by a user. Further, the amount of text displayed may be based upon the column configuration or based upon the textual summary length.

FIG. 14 illustrates a search results page with displayed snippets. The snippets are also referred to as textual summaries. The two paragraphs 108 and 110 illustrate two possible snippets from one or more webpages. If the user chooses to display medium length snippets, then the snippet from the second paragraph 110, where the search term "term A" appears twice (the snippet consists of the 4 highlighted sentences) is displayed. If the user then switches to short snippets, the search engine shortens the snippet to include just the first sentence (guisgue est term A, sodales in, varius sit amet, imperdiet et, arcu) appearing in the snippet from the second paragraph 110. In another embodiment, the search engine may instead pick the bolded sentence (Donec nonummy Term A mi) from the first paragraph 108 because paragraphs near the top of the page are scored higher and explanatory text is more likely to appear in the document introduction. A snippet essentially gives the user a preview of a document. A snippet length preference therefore not only lets the user choose the size of the preview, but the location of the preview as well.

In one embodiment, the user may choose to change the length of the snippets to include more results with shorter snippets, or less results with longer snippets. The user may wish to see more detail per result at the expense of seeing fewer results, or less detail with more results. Alternatively, a user may find short snippets preferable for certain kinds of searches (for example, if the user wishes to scan a number of sites to see the price for a particular product, X). On the other hand, long snippets may be desirable for other types of searches (for example, if a user wants to learn more about a particular individual, Y).

Figure 15:
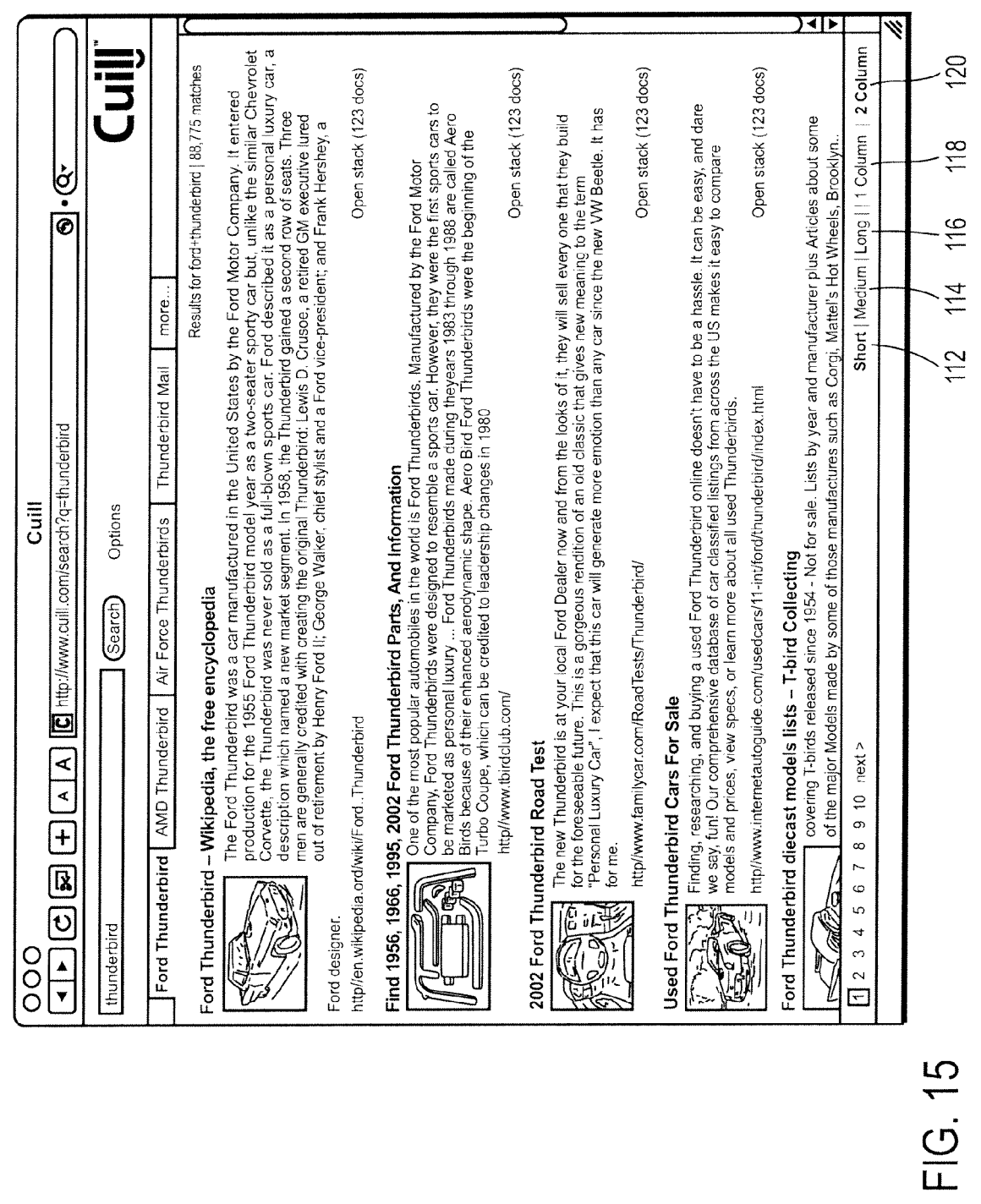
Figure 16:
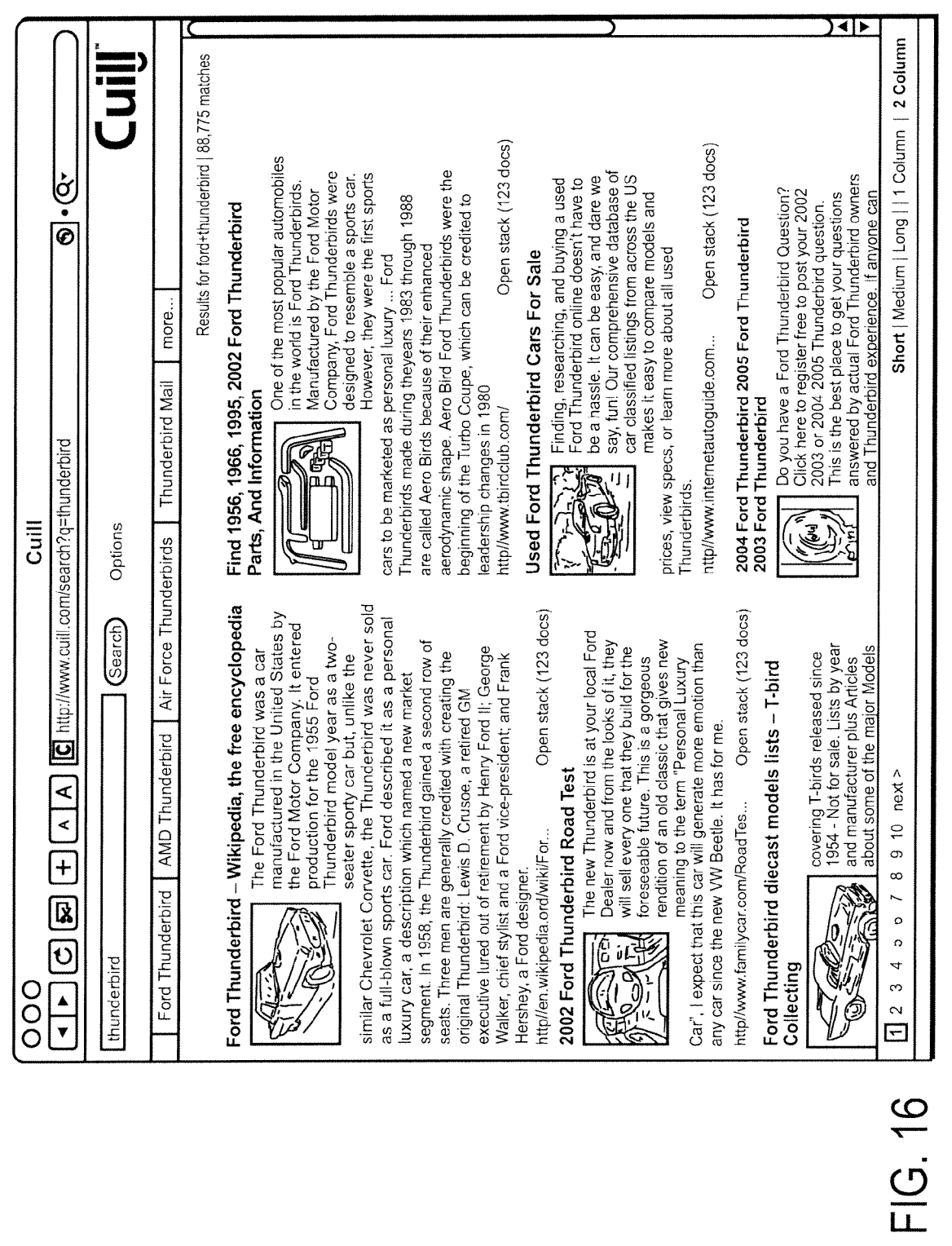

As discussed above, the number of columns displayed may be changed based upon a user's preference or automatically by the search engine, depending upon a number of factors such as, for example, the size of the browser window. Further, one or more choices for the number of columns to be displayed may also be provided. FIG. 15 illustrates a graphical user interface screen displaying long length snippets in a single column presentation format. In the illustrated example, a user may select one or more snippet sizes, "short" 112, "medium" 114 or "long" 116 and one or more presentation formats "1 column" 118 or "2 column" 120 for displaying the snippets. FIG. 16 illustrates a user interface screen display, displaying long length snippets in a double column presentation format.

In another aspect of the present invention, a "direct navigation" technique is disclosed that enables a user to find one or more web sites that match the user's text, as the user types a query. Sometimes the match is straightforward (for example, a search query term "amazon" matches the URL—"www.amazon.com") but this is not generally the case: for example, the query "san fran chronicle" should ideally match the URL—www.sfgate.com. The disclosed technique utilizes a number of heuristics to determine the best match. In one embodiment, match indicia are produced that directs a user to a website without returning a search result page. The match indicia may include at least two of a destination URL, a destination icon and a trade name. Further, the destination icon may be retrieved without accessing a website landing page. In one embodiment, the match indicia has a related advertisement.

In another embodiment, a scroll area displaying search results and a permanently displayed anchored content area may be displayed. The anchored content area includes a search box. The anchored content area may also include advertisements, announcements, news reports, content relevant to a user, pagination controls, column controls and textual summary length controls. In one embodiment, a Search Result Direct Navigation Module 222 includes executable instructions to display a set of navigation choices associated with a search query term.

Figure 17:
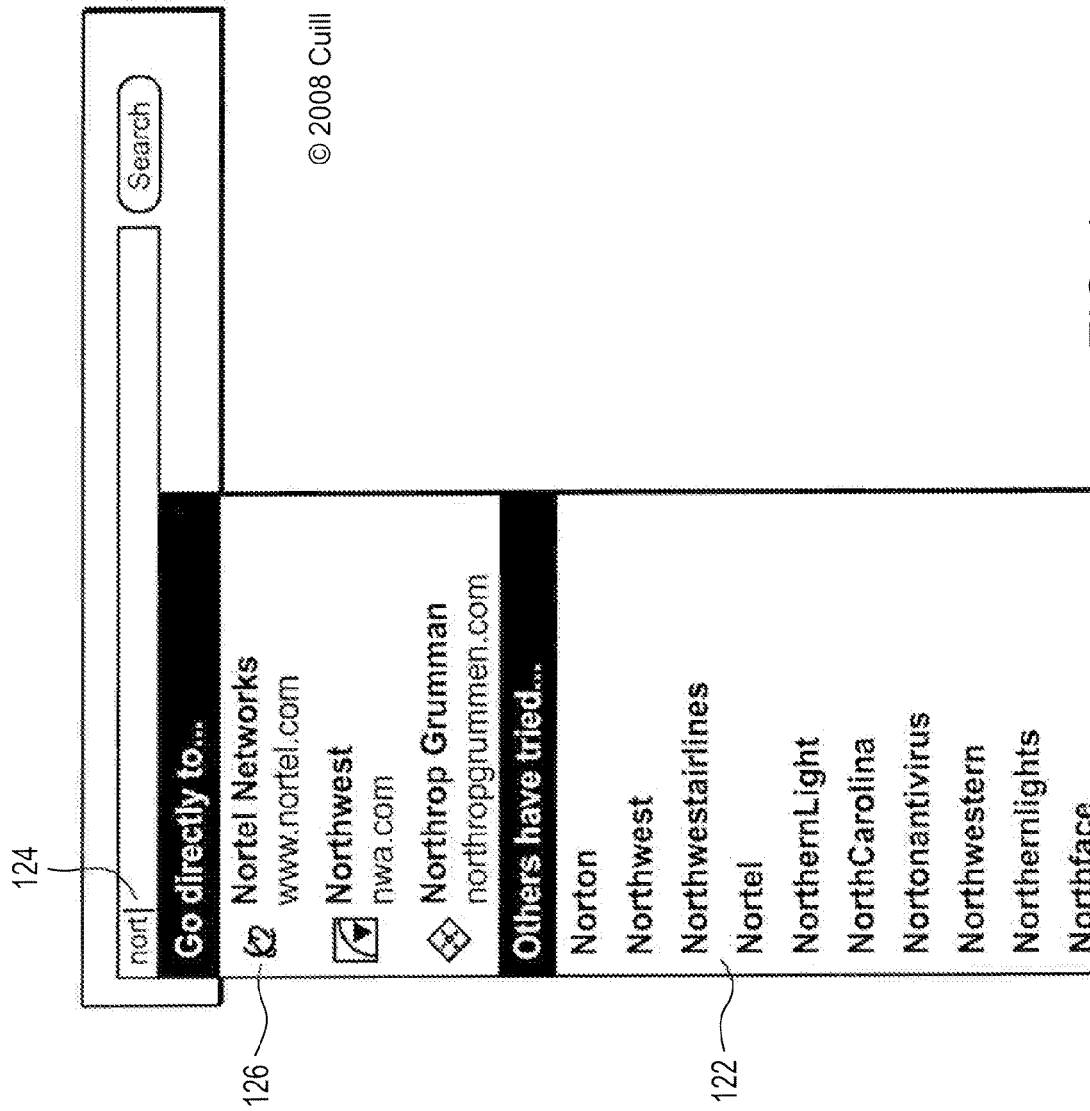
FIG. 17 is an illustration of the direct navigation technique, in accordance with one embodiment of the invention.

FIG. 17 is an illustration of the direct navigation technique in accordance with one embodiment of the invention. One or more navigation choices are retrieved and included in a search assist box 122. The navigation choices appear in the search assist box 122 as the user types the search query, "nort" in the search bar 124. The direct navigation technique disclosed in accordance with embodiments of the present invention enables a user to directly navigate to a particular site from the "search suggest" box 122, without having to view a standard search results page and clicking on one or more of the search results.

When a user clicks on a particular navigation choice, the user is taken directly to the associated site, bypassing the search results page altogether. Further visual aids may be provided to indicate the availablity of a particular site to a user. For example, as illustrated in FIG. 17, a destination URL, for example, www.nortel.com is displayed. Also, the trade name or official or generally understood name, Nortel Networks, is displayed Also observe that the icon 126 used by the site for branding and identification purposes (sometimes called a favicon) is reproduced in the box 122 next to the site name and URL. Accordingly, the navigation choice provides a strong visual confirmation of the user's intended site. The visual representation of a navigation choice helps a user navigate through the search suggest/assist results and identifies the official website for those companies. As mentioned above, the navigation choices may be retrieved by the search engine from a website landing page or obtained in some other way including directly from the owner of the website landing page. The navigation choice placed in the "search suggest" box 122 may also be sold by the search engine as a placed advertisement or additional feature.

Figure 18:
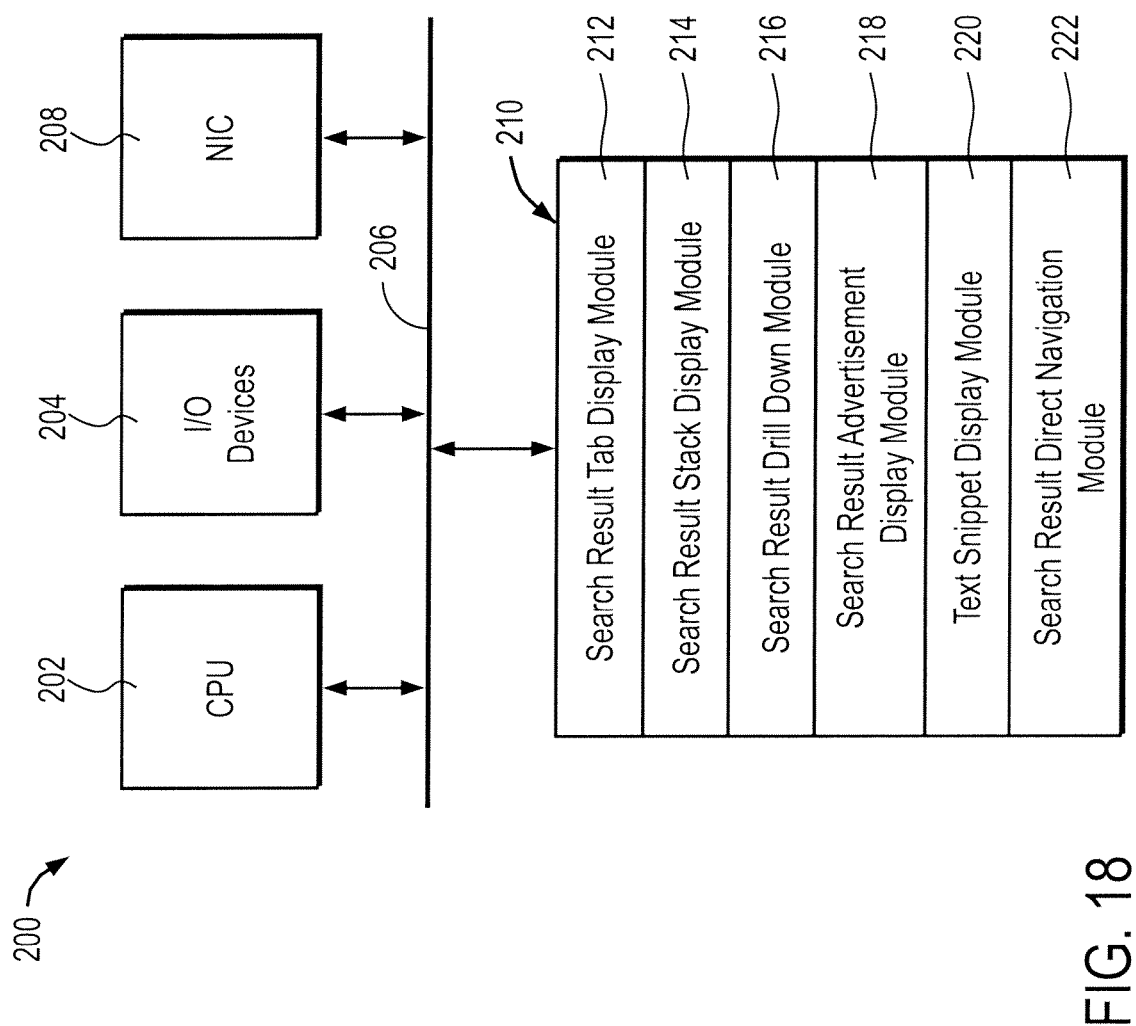
FIG. 18 illustrates a computer configured in accordance with an embodiment of the invention.

FIG. 18 illustrates a computer configured in accordance with one embodiment of the present invention. The computer 200 includes standard components, including a Central Processing Unit (CPU) 202 and input/output devices 204, which are linked by a bus 206. A Network Interface Circuit (NIC) 208 provides connectivity to a network (not shown), thereby allowing the computer 200 to operate in a networked environment.

A memory 210 is also connected to the bus 206. The memory 210 includes one or more executable modules to implement operations of the invention. In one embodiment, the memory 210 includes a Search Result Tab Display Module 212, a Search Result Stack Display Module 214, a Search Result Drill Down Module 216, a Search Result Advertisement Display Module 218, a Text Snippet Display Module 220 and a Search Result Direct Navigation Module 222.

The Search Result Tab Display Module 212 includes executable instructions to display tabs representative of different classes of search results derived in response to the processing of a query. The Search Result Stack Display Module 214 includes executable instructions to display common attributes associated with a tab but having a refined meaning representing different classes of search results. The Search Result Drill Down Module 216 includes executable instructions to display a listing of results derived from processing a query and a menu of refining search terms that is dynamically derived in response to the processing of the query. The Search Result Advertisement Display Module 218 includes executable instructions to display a set of advertisements associated with a search query term. The Text Snippet Display Module 220 includes executable instructions to display text snippet results associated with a search query term. The Search Result Direct Navigation Module 222 includes executable instructions to display a set of navigation choices associated with a search query term. The operations performed by the executable modules in the memory 210 are discussed in detail with respect to FIGS. 1-17 disclosed above.

It should be noted that the executable modules stored in memory 210 are exemplary. Additional modules, such as an operating system or graphical user interface module may also be included. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and or server-side. It is the functions of the invention that are significant, not where they are performed or the specific manner in which they are performed.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD- ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer-readable medium for storing instructions, the instructions comprising:
a plurality of instructions that, when executed by one or more processors, cause the one or more processors to:
present a browser window that displays a web page based on a transmission of a search query that includes one or more terms;
present a plurality of tabs that are part of the web page,
the plurality of tabs being associated with a plurality of concepts,
the plurality of concepts being associated with the search query,
each concept, of the plurality of concepts, being based on a related query of a plurality of related queries associated with the search query,
each related query, of the plurality of related queries, including the one or more terms and one or more additional terms,
each tab, of the plurality of tabs, being associated with a different concept of the plurality of concepts and specifying a respective related query of the plurality of related queries associated with the search query;
present a plurality of stacks associated with a tab of the plurality of tabs,
the plurality of stacks being associated with a particular concept, of the plurality of concepts, associated with the tab,
each stack, of the plurality of stacks, including information regarding a respective plurality of search result documents associated with a different type of information, of a plurality of types of information-relating to the particular concept;
present a menu that displays, when a particular stack, of the plurality of stacks, is selected, information regarding two or more search result documents associated with a particular type of information of the plurality of types of information,
the two or more search result documents having a common attribute; and
cause a search, relating to a particular related query of the plurality of related queries, to be performed if selection of a particular tab, of the plurality tabs, is detected,
the particular tab specifying the particular related query.

2. The non-transitory computer-readable medium of claim 1, where the menu includes a drop down list menu.

3. The non-transitory computer-readable medium of claim 1, where the menu includes a scroll over pop-up menu.

4. The non-transitory computer-readable medium of claim 1, where the menu includes a flip through menu.

5. The non-transitory computer-readable medium of claim 1, where the plurality of instructions, when executed by the one or more processors, further cause the one or more processors to present a sponsored tab including links to advertisements.

6. The non-transitory computer-readable medium of claim 1, where the plurality of instructions, when executed by the one or more processors, further cause the one or more processors to present a list, that is part of the web page, of terms that refine the one or more terms of the search query.

7. A non-transitory computer-readable medium storing instructions, the instructions comprising:
one or more instructions that, when executed by one or more processors, cause the one or more processors to:
receive a search query that includes one or more terms;
generate a plurality of related queries associated with the search query,
each related query, of the plurality of related queries, including the one or more terms and a variation of the one or more terms,
each related query, of the plurality of related queries, identifying a respective concept of a plurality of concepts,
the plurality of concepts being associated with the search query;
present, based on receiving the search query, a plurality of tabs relating to the search query,
each tab, of the plurality of tabs, identifying a respective related query of the plurality of related queries associated with the search query;
detect selection of a first tab of the plurality of tabs,
the first tab being associated with a particular concept of the plurality of concepts;
present, based on detecting the selection of the first tab, a plurality of stacks associated with the particular concept,
each stack, of the plurality of stacks, including information regarding a plurality of documents associated with a different type of information, of a plurality of types of information associated with the particular concept;
detect selection of a stack of the plurality of stacks;
present, based on receiving detecting the selection of the stack, information regarding two or more documents,
the two or more documents being included in the stack and being associated with a particular type of information of the plurality of types of information; and
cause a search to be performed when selection of a second tab, of the plurality of tabs, is detected,
the search relating to a particular related query, of the plurality of related queries, identified by the second tab.

8. The computer-readable medium of claim 7, where the two or more documents include a common attribute.

9. The computer-readable medium of claim 7, where the one or more instructions to present the information regarding the two or more documents include:
one or more instructions that, when executed by the one or more processors, cause the one or more processors to present a menu that lists the two or more documents.

10. A method comprising:
receiving, at one or more server devices, a search query that includes one or more terms;
presenting for display, by the one or more server devices and based on receiving the search query, a first tab of a browser window,
the first tab including information identifying search result documents relating to the search query;
presenting for display, by the one or more server devices and based on receiving the search query, a plurality of second tabs of the browser window,
the plurality of second tabs being presented for display with the first tab,
each second tab, of the plurality of second tabs, identifying a respective related query of a plurality of related queries associated with the search query,
each related query, of the plurality of related queries, including the one or more terms and one or more additional terms,
each related query, of the plurality of related queries, identifying a respective concept of a plurality of concepts,
the plurality of concepts being associated with the search query,
at least one second tab, of the plurality of second tabs, including a plurality of stacks,
the at least one second tab being associated with a particular concept of the plurality of concepts,
each stack, of the plurality of stacks, including information identifying a plurality of search result documents,
the plurality of search result documents being associated with a different type of information of a plurality of types of information relating to the particular concept,
the plurality of search result documents of a particular stack, of the plurality of stacks, having a common attribute; and
causing, by the one or more server devices, a search to be performed when selection of a particular second tab, of the plurality of second tabs, is detected,
the search relating to a particular related query, of the plurality of related queries, identified by the particular second tab.

11. The method of claim 10, where each second tab, of the plurality of second tabs, includes an image associated with a respective concept of the plurality of concepts associated with the search query.

12. The method of claim 11, where the image includes an icon.

13. The method of claim 10, where each second tab, of the plurality of second tabs, is related to a particular category, from a set of categories, associated with the search query.

14. The method of claim 10, where at least two second tabs, of the plurality of second tabs, are related to different meanings of a term of the one or more terms included in the search query.

15. The method of claim 10, where at least one second tab, of the plurality of second tabs, includes a sub-tab.

16. The method of claim 10, further comprising:
generating the plurality of related queries,
where the plurality of related queries are based on one or more of stems, abbreviations, word grouping, spelling variations, semantic relationships, synonyms, acronym expansion, terms that divide a search space into substantially non-overlapping subsets, capitalization, or techniques that consider preceding and subsequent terms for a related query.

17. The method of claim 10, where presenting for display the plurality of second tabs comprises:
determining, for each second tab, of the plurality of second tabs, a relevance of content of the second tab to the search query;
ordering the plurality of second tabs based on the determined relevance, and
presenting the ordered plurality of second tabs for display.

18. The method of claim 17, further comprising ordering the plurality of second tabs based on a quality of search result documents associated with the plurality of second tabs.

19. The method of claim 18, where the quality of the search result documents is based upon a query independent metric.

20. The method of claim 18, where the quality of the search result documents is based upon a query dependent metric.

21. The method of claim 17, where determining the relevance comprises determining the relevance based upon the plurality of related queries.

22. The method of claim 17, where determining the relevance includes determining the relevance based upon historical tab click through data.

23. The method of claim 17, where determining the relevance includes determining the relevance based upon human specified criteria.

24. The method of claim 17, where determining the relevance includes determining the relevance based upon lexical metrics.

25. The method of claim 10, where presenting for display the plurality of second tabs comprises presenting for display a drop down menu of the plurality of second tabs.

26. The method of claim 10, where presenting for display the plurality of second tabs includes presenting for display the plurality of second tabs in an alphabetical order.

27. The method of claim 10, where presenting for display the plurality of second tabs includes:
presenting for display the plurality of second tabs in an order based on a ranking score reflecting a measure of quality of documents associated with the plurality of second tabs.

* * * * *